United States Patent [19]

Reed

[11] 3,909,554

[45] Sept. 30, 1975

[54] CONTROL CIRCUIT FOR KEY TELEPHONE SYSTEM

[75] Inventor: John M. Reed, Breckenridge, Colo.

[73] Assignee: Lordel Manufacturing Company, Monrovia, Calif.

[22] Filed: Aug. 23, 1974

[21] Appl. No.: 500,030

[52] U.S. Cl. .............................................. 179/99

[51] Int. Cl.².......................................... H04M 1/00

[58] Field of Search...... 179/99, 18 FA, 18 F, 84 R, 179/84 A

[56] References Cited

UNITED STATES PATENTS

| | | | |
|---|---|---|---|
| 3,715,516 | 2/1973 | Ebrahimi | 179/99 |
| 3,764,752 | 10/1973 | Yachabach | 179/99 |
| 3,856,994 | 12/1974 | Ozechoski | 179/99 |

*Primary Examiner*—William C. Cooper
*Assistant Examiner*—Thomas D'Amico
*Attorney, Agent, or Firm*—Criddle & Thorpe

[57] ABSTRACT

A key telephone system control circuit includes completely solid-state circuitry for performing all internal logical operations of the circuit and a pair of high current relays for performing the output functions of the control circuit. The solid-state circuitry produces one or more of three different control signals in response to various conditions on a telephone line pair to which a key telephone system is connected and in response to various conditions of the key telephone system. The three control signals control the operation of the two relays to generate all output functions required for the key telephone system. The control circuit includes holding circuitry having a latching device for producing one of the control signals indicative of the holding status of the line pair.

7 Claims, 1 Drawing Figure

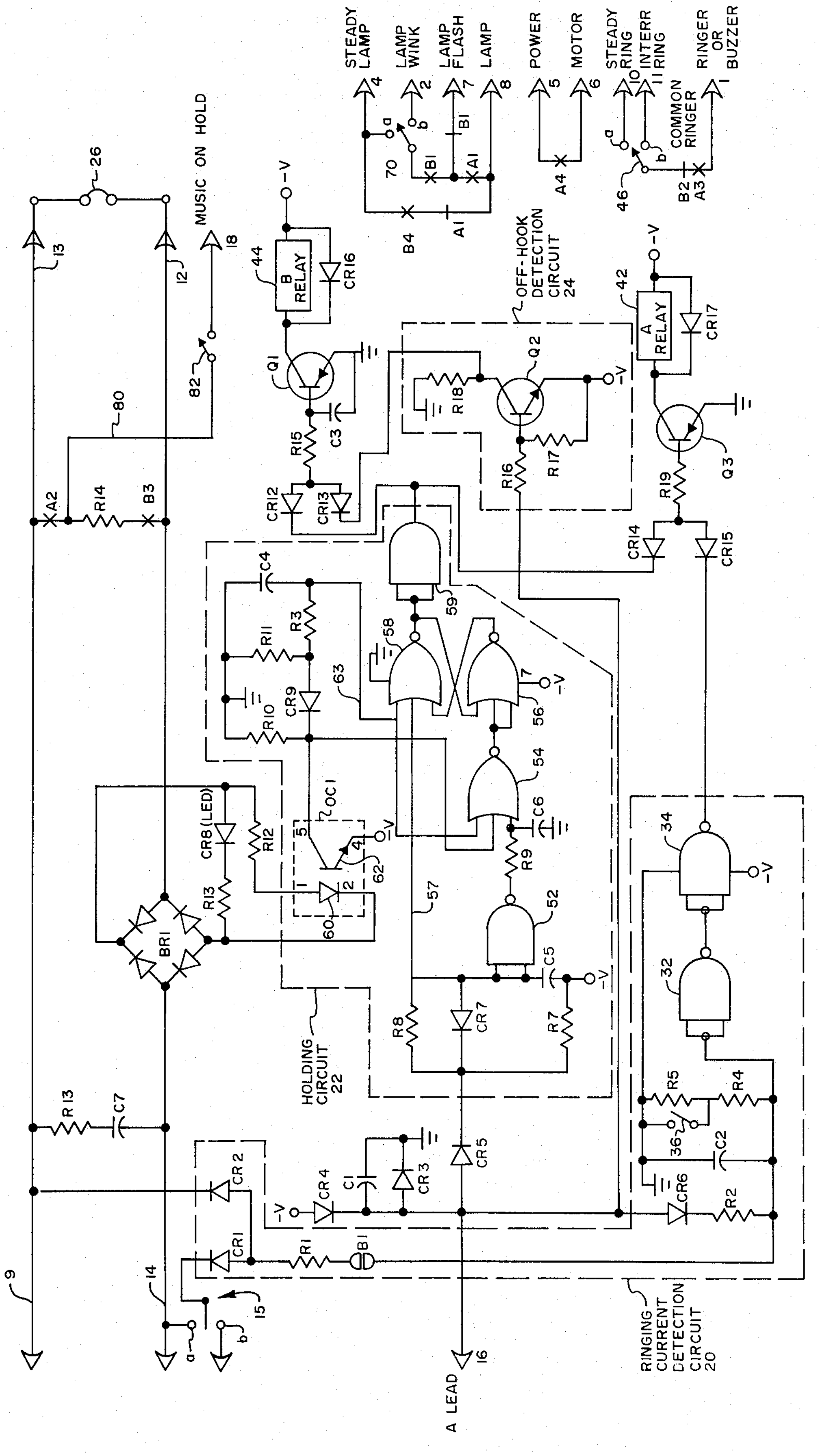
STEADY LAMP
LAMP WINK
LAMP FLASH
LAMP
POWER
MOTOR
STEADY RING
INTERR RING
RINGER OR BUZZER
COMMON RINGER
MUSIC ON HOLD
OFF-HOOK DETECTION CIRCUIT 24
B RELAY
A RELAY
HOLDING CIRCUIT 22
RINGING CURRENT DETECTION CIRCUIT 20
A LEAD

CONTROL CIRCUIT FOR KEY TELEPHONE SYSTEM

BACKGROUND OF THE INVENTION

Key telephone sets provide for the termination of a plurality of telephone lines in one telephone set and allow calls to be made to or from the set over any one of those lines. In addition, any line terminating in the set for which a talking path has been established can be placed on "hold" (the line is temporarily disconneced from the set) and another talking path established on a separate line terminating in the set. The second line can, in turn, be placed on hold while still a third line is utilized, etc. Then, if "reconnection" is desired to one of the lines placed on hold, a button on the key telephone set corresponding to that line is depressed thereby reconnecting the line to the set. The conversation over that line can then be resumed.

In order to notify the user of the telephone set of the status of the various lines terminating in the set, various auditory and visual signals are provided. One such signal, common to both the standard telephone set and the key telephone set, is the ringing or buzzing signal which notifies the user that there is an incoming call on one of the lines. On the key telephone set, there is also a light signal (normally a flashing light signal) emitted from a lamp corresponding to the line over which the incoming call is being made. This signal notifies the user of the line to which he should connect to receive the incoming call. The user would then depress a button on the set corresponding to this line thereby connecting the line to the set and the call would be ready to be received.

After the key telephone handset is removed from the hook, another visual signal is provided by a lamp corresponding to the line to which the key telephone set is presently connected. This signal is normally a steady light signal and indicates that the particular line in question is in use. This is important if a number of lines are each connected to a number of different key telephone sets so that the user of one such set will be notified when one of the lines is being used by the user of another of such sets.

The final signal provided by the key telephone set is that indicating that a particular line is on hold. This signal is also a visual signal consisting normally of a winking light signal from the lamp corresponding to the line which is on hold. (A winking light signal is less intermittent than a flashing light signal.)

Key telephone systems consist primarily of three main parts — (1) the key telephone set which includes the receiver and transmitter, dialing circuitry, and line lamps, (2) the key telephone system power supply for providing ringer or buzzer current, line lamp current, etc., and (3) the control circuit for controlling the functions and operations of the key telephone system. Prior art key telephone system control circuits typically include a number of mechanical relays in combination with other circuitry, such relays being utilized for both the generation of output functions and for internal control. Use of relays for the generation of output functions is desirable because they provide isolation and because of their high current carrying capacity. However, generation of internal functions for the control circuit are best performed using solid-state circuitry since such circuitry operates very rapidly and generally requires less power than relay logic.

A number of key telephone system control circuits have been developed, some of which use solid-state circuitry (W. C. Hatfield and J. M. Reed, U.S. Pat. No. 3,766,325) and others of which utilize relays for generating both the output functions and the internal control functions (R. E. Barbato et al, U.S. Pat. No. 3,436,488 and A. R. Fitzsimons et al, U.S. Pat. No. 3,649,772). No control circuits have been found, however, which combine the best features of solid-state circuitry (for generating the internal control functions) with the best features of relays (for generating the output functions).

SUMMARY OF THE INVENTION

It is an object of the present invention to provide a simple, compact and reliable key telephone control circuit.

It is another object of the present invention to provide a key telephone control circuit in which all internal control operations are performed using solid-state circuitry and in which all output functions are produced with a pair of relays.

It is still another object of the present invention to provide a key telephone system control circuit in which all output functions are produced in response to the generation of one or more of three control signals.

These and other objects of the present invention are realized in an illustrative key telephone system control circuit which includes a ringing current detection circuit connected to the tip and ring of a telephone line, an off-hook detection circuit coupled to the "A" lead associated with the telephone line, a holding circuit connected to either the tip or ring and to the "A" lead, and a pair of relays, one of which is coupled to the ringing current detection circuit and to the holding circuit, and the other of which is coupled to the off-hook detection circuit and the holding circuit.

Each of the three circuits develops a control signal determined by the conditions on the tip and ring and on the "A" lead. The control signals control the operation of the relays which, in turn, control the application of current from various current supply sources to the interruptor motor, line lamps, and ringer or buzzer of the key telephone set.

DESCRIPTION OF THE DRAWING

A complete understanding of the present invention and of the above and other advantages thereof may be gained from a consideration of the following detailed description of one embodiment of the invention presented in connection with the accompanying drawing which shows one illustrative circuit configuration for such an embodiment.

DETAILED DESCRIPTION

The circuit of the drawing is designed for use with one of the line pairs terminating in a standard key telephone set. The circuit includes a pair of wires 14 and 9, known as the tip and ring respectively, of a telephone line, over which ringing signals are received by the circuit and voice signals are transmitted to and from a key telephone set receiver 26. Wire 14 is connected to the key telephone set receiver 26 via a full-wave diode bridge rectifier BR 1. The bridge BR 1 enables transfer of DC current of the proper polarity to a holding circuit 22 regardless of the polarity of the signals received over line 14.

Switch 15 is provided to allow coupling a ringing current detection circuit 20 to either wire 14 or to some interconnect device used to interface key telephone control circuits to telephone control offices. When the switch 15 is closed on contact *a*, the circuit 20 is coupled to wire 14 and when the switch 15 is closed on contact *b*, the circuit 20 is coupled to the interconnect device. In either case, ringing current is applied via the switch 15 to the circuit 20.

When a call is made to the key telephone set for which the circuit of the drawing provides control, AC ringing current is applied from wires 9 and 14 (or from an "interconnect" device coupled to contact *b* of switch 15) to the ringing current detection circuit 20. Specifically, ringing current is applied via diodes CR1 or CR2 for negative half cycles of the current and via a resistor R1 to a neon gas discharge tube B1. When the magnitude of these negative half cycles exceeds the threshold of the tube B1, the tube fires allowing current to pass therethrough to charge a capacitor C2. The tube B1 is provided to prevent application of spurious DC current to the rest of the ringing current detection circuit 20 from wires 9 and 14. Of course, if the DC current were of sufficient magnitude and of proper polarity, it could cause the tube to erroneously fire.

Several cycles of ringing current are generally required to charge the capacitor C2. When the voltage across the capacitor reaches a certain threshold level, a NAND gate 32 is enabled causing it to generate a positive output signal. The positive output signal of NAND gate 32 enables another NAND gate 34 causing it to generate a negative output signal. The negative output signal (hereafter referred to as the first control signal) from NAND gate 34 is applied via a diode CR15 and a resistor R19 to the base of a transistor Q3, causing the transistor to turn on. Turning on the transistor Q3 allows current to flow through the coil of a relay 42 causing the relay to operate. Operation of relay 42 allows current to flow from a power supply 5 through now closed contact A4 of the relay 42 to the key telephone set interruptor motor connected to terminal 6. The interruptor motor is thereby turned on allowing it to operate an interrupter which is used to provide various, intermittent signals for operating the key telephone set lamps and ringer or buzzer. One such intermittent signal is applied to lead 7 and then via now closed contact A1 of the relay 42 to a lamp on the key telephone set connected to terminal 8. This lamp is associated with the line pair 9 and 14 so that when ringing current is received over the pair, the lamp generates a flashing light signal to notify the telephone set user that an incoming call is present on the line.

Operation of relay 42 also allows current to flow from either a steady ring current supply connected to terminal 10 or an interrupted ring current supply connected to terminal 11 via normally closed contact B2 of a relay 44 and now closed contact A3 of relay 42 to the ringer or buzzer of the key telephone set connected to terminal 1. Selection of either a steady ring or an interrupted ring is made by appropriate positioning of a movable contact of a switch 46. If a steady ring is desired, then the switch 46 is set in position *a* and if an interrupted ring is desired, then the switch 46 is set in position *b*. The ringer or buzzer is thereby operated to provide an audible signal for notifying the user that an incoming call is present on the line pair.

To recapitulate, when ringing current is detected on line 9 or 14, a first control signal is generated to operate relay 42 and thereby turn on an interruptor motor, cause lamp-flash current to be applied to the lamp associated with the line pair 9 and 14, and cause ringing current, either steady or interrupted, to be applied to the key telephone set ringer or buzzer.

When a call is abandoned by the calling party before the called party answers, charging current for capacitor C2 is no longer applied via the gas discharge tube B1 to the capacitor and the capacitor begins to discharge either through resistors R4 and R5 (if a switch 36 is open) or through R4 alone (if the switch 36 is closed). When the voltage across capacitor C2 falls below the threshold necessary to enable NAND gate 32, the NAND gate is disabled resulting in the disablement of NAND gate 34, the turning off of the transistor Q3, and the release of relay 42. Release of relay 42 opens the current path to the interrupter motor, the line lamps corresponding to the line pair 9 and 14 and the telephone set ringer or buzzer. Switch 36 is provided to allow selective discharge times for the capacitor C2. When the switch 36 is closed, a faster discharge results and when the switch 36 is open, a slower discharge results.

When the telephone receiver 26 is taken off hook in response to an incoming call, a DC path is closed across leads 12 and 13 through the receiver 26, and the ground potential is applied to lead 16, known as the A lead associated with the line pair 9 and 14. The telephone switching office which is supplying the ringing current over the wire 9 detects the DC path closure and removes the ringing current. If the capacitor C2 is still charged, it is desirable that it be immediately discharged so that the key telephone set ringer or buzzer will not be operated while the call is underway. The ground potential placed on the A lead 16 causes the rapid discharge of the capacitor C2 through diode CR6 and resistor R2. This results in the relay 42 being released and the removal of current from the interrupter motor, line lamp and ringer or buzzer.

The ground potential on the A lead 16 is supplied to an off-hook detection circuit 24 to bias a transistor Q2 into a conducting condition causing it to generate a second control signal. This second control signal (current flowing through the transistor Q2) is applied via a diode CR13 and a resistor R15 to bias a transistor Q1 into the conducting condition. The transistor Q1 then allows current to flow through the coil of a relay 44 causing the relay to operate. Operation of relay 44 allows current to flow from a steady-lamp source 4 via now closed contact B4 of relay 44 and normally closed contact A1 of relay 42 to the lamp connected to terminal 8. The steady lamp signal now applied to the lamp indicates that the receiver 26 has been taken off hook, i.e., that the incoming call on the line pair 9 and 14 has been answered.

The presence of ground potential on the A lead 16 and the presence of DC current in the line loop (lead 12, telephone receiver 26 and lead 13) prepares a holding circuit 22 for going to a hold condition. The ground potential on the A lead 16 charges a capacitor C5 through a diode CR5 and a resistor R8. When the voltage across the capacitor C5 exceeds a certain threshold level, a NAND gate 52 is enabled to generate a negative output signal. The negative output signal begins to charge a capacitor C6 via a resistor R9. When the voltage across the capacitor C6 reaches a certain threshold level, it will provide one logical input to a NOR gate 54. DC current in the line loop is applied via the bridge BR1 to a diode 60 of an optically-coupled isolator OC1. The diode 60 is thus forward biased into a conducting condition and caused to emit light which impinges on a transistor 62 of the isolator OC1 causing the transistor to assume a conducting condition. Negative current is thus supplied via the transistor 62, a diode CR9 and a resistor R3 to a capacitor C4 to charge the capacitor. The charge on the capacitor C4 provides a second input to NOR gate 54 and the collector current of the transistor 62 provides a third input thereto. With the three inputs to the NOR gate 54 negative, the NOR gate is caused to generate a positive output signal which is applied to another NOR gate 56 of a latch circuit. The holding circuit 22 is now prepared to go into a hold condition or mode if such is required.

Line current flowing through the line loop is applied via the bridge BR1 and a resistor R13 to a light emitting diode CR8 causing the diode to emit light which indicates that the line pair 9 and 14 are busy. The diode CR8 could be locoated on a line card containing the circuitry of the drawing, for example, to provide repairmen or other maintenance people with an indication of when the line pair 9 and 14 is busy.

The function of the holding circuit 22, as described thus far, has been to remember that ground potential has been applied to the A lead 16 and that line current flowed in the line pair 12 and 13. As will be discussed later, these two conditions must exist prior to the circuit of the drawing being placed in a hold condition. The capacitor C5 provides for filtering out transients which may occur on the A lead 16 by requiring that the ground potential applied to the A lead persist for a certain period of time sufficient to charge capacitor C5 to a level capable of enabling the NAND gate 52.

The line represented by the line pair 9 and 14 is placed on hold by depressing the hold button of the key telephone set. Depressing the hold button removes the ground from and causes application of negative potential to the A lead 16 thereby removing the bias current from the transistor Q2 causing the transistor to turn off. Turning off the transistor Q2, in turn, terminates generation of the second control signal and causes transistor Q1 to turn off. Relay 44 is thus released and the current path from the steady-lamp supply 4 to the key telephone set lamp connected to terminal 8 is opened.

Removal of ground potential from and application of negative potential to the A lead 16 permits the capacitor C5 to discharge through a diode CR7 and a resistor R7. With C5 discharged, a negative input condition is supplied via lead 57 to a NOR gate 58. Since, as previously discussed, the output of NOR gate 54 is positive following removal of the receiver 26 from the switch hook, the output of a NOR gate 56 is negative thereby providing a second negative input to NOR gate 58. Also, since the capacitor C4 has been charged as a result of DC current flow in the line loop, a third negative input is supplied via lead 63 to the NOR gate 58. The NOR gate 58 is thus caused to generate a positive output signal which is supplied to NOR gate 56, to maintain or latch the output of NOR gate 56 negative and to a NAND gate 59 causing it to generate a negative output signal (hereinafter referred to as the third control signal). Generation of the third control signal biases both transistors Q1 and Q3 into a conducting condition thereby allowing current to flow through the coils of relays 44 and 42 causing the relays to operate. With both relays 42 and 44 operated, a DC path between leads 12 and 13 is provided via contact A2 of relay 42, resistor R14 and contact B3 of relay 44. This path provides the closed loop necessary for the telephone switching office to maintain the connection with the line pair 9 and 14. Now, even though the telephone receiver 26 is placed on hook or the key telephone set is switched to another of its terminating lines (either of which opens the DC path from lead 12 through the telephone set to lead 13), the telephone switching office connection with line pair 9 and 14 will be maintained.

Operation of both relays 42 and 44 also closes a current path from either the steady-lamp source 4 or a lamp-wink source 2 via contact B1 of relay 44 and contact A1 of relay 42 to the station lamp connected to terminal 8. Whether steady-lamp current or lamp-wink current is supplied to the station lamp is determined by the setting of a switch 70. If the switch 70 is in the *a* position, steady-lamp current is supplied to the lamp and if the switch is in the *b* position, then lamp-wink current is supplied to the station lamp. (Normally, a lamp-wink signal is used to indicate that a particular line has been placed on hold.)

As is apparent from the above discussion, three conditions are required for the circuitry to assume a hold condition. These conditions are (1) the flow of line current on the line pair 12 and 13, (2) depression of the hold button to remove ground potential from the A lead 16 and apply negative potential thereto, and (3) the A lead 16 having been at ground potential just prior to depression of the hold button indicating that the receiver of the telephone set was off hook. The function of the capacitor C6 is to remember that the A lead 16 was at ground potential just prior to depression of the hold button to remove the ground potential. With these three conditions for the hold operation, the possibility of the telephone set assuming a hold condition due to stray line capacitance when the receiver is on hook is eliminated. That is, if only the first two conditions were required for going into a hold condition, while the receiver was on hook (and thus ground potential was not being applied to the A lead 16), current might be caused to flow on the line pair 12 and 13 because of stray line capacitance so that the telephone set would mistakenly assume a hold condition.

Release of the hold condition is accomplished either by reselection of a line at the key telephone set thereby causing ground potential to be applied to the A lead 16 or by the party at the other end of the line hanging up the telephone receiver thereby preventing further flow of current on the line pair 12 and 13. In the first case — ground potential being applied to lead 16 — the transistor Q2 is biased on to develop the second control signal to maintain the transistor Q1 biased in the on condition and relay 44 continues in the operated condition. A lead 16 also causes NOR gate 58 to generate a negative output and provides charging current to the capacitor C5 through diode CR5 and resistor R8. The NAND gate 52 is enabled when the charge on the capacitor C5 exceeds the predetermined threshold level and a negative signal is applied by the NAND gate 52 to charge the capacitor C6 and cause the NOR gate 54 to apply a positive signal to reset the binary latch comprising NOR gates 56 and 58. The negative signal produced by NOR gate 58 causes NAND gate 59 to generate a positive output. Transistor Q3 is therefore turned off and relay 42 is released. This opens the current paths from the lamp-wink source 2 to the line lamp connected to terminal 8, and from the power supply 5 to the interruptor motor connected to the terminal 6. The holding current path through resistor R14 is also opened. The circuit of the drawing is thus returned to the off-hook condition.

The other method of removing the hold condition is initiated when current ceases to flow on lines 12 and 13 causing the isolator OC1 to become non-conducting. The capacitor C4 then begins to discharge through resistors R11 and R3 and if the discharging continues to a level below the input threshold of the NOR gate 58, then the output of the NOR gate becomes negative and the binary latch is reset. The output of NAND gate 59 becomes positive thereby turning off transistors Q1 and Q3. Both relays 42 and 44 are thus released and the circuitry is returned to the idle line condition.

The required time for an open loop condition to result in the discharge of the capacitor C4 to a level below the input threshold of the NOR gate 58 depends, of course, upon the value of the capacitance of the capacitor C4 and the value of the resistors R11 and R3. This time may be selected simply by appropriate selection of these values.

Operation of the circuitry of the drawing for an outgoing call, i.e., a call initiated by depressing the line button associated with the line pair 9 and 14 and removal of the telephone receiver 26 from its switchhook, is the same as that discussed for an incoming call. Specifically, ground potential is applied to the A lead 16 biasing the transistor Q2 into the on condition causing it to generate the second control signal which, in turn, turns on the transistor Q1, operating relay 44.

Lead 80 coupled to the junction between the A2 contact of relay 42 and resistor R14 is provided to supply music to a distant caller or called party when the circuitry of the drawing is placed in the hold condition. If it is desired that such music be provided, then switch 82 is closed and terminal 18 is coupled to an appropriate transmitter for applying signals via the lead 80 to the line pair 12 and 13.

It is to be understood that the above-described embodiment is only illustrative of the application of the principles of the present invention. Modifications in this embodiment may be devised by those skilled in the art without departing from the spirit and scope of the invention. The following claims are intended to cover such modifications.

What is claimed is:

1. In combination in a key telephone system, a control circuit comprising
- a telephone line pair connected to a telephone switching office and to a key telephone set receiver,
- a ringing current detection circuit responsive to ringing current on said line pair for generating a first control signal,
- an off-hook detection circuit responsive to a certain signal being applied to the A lead associated with said line pair for generating a second control signal,
- a holding circuit responsive to the coincidence of the application of said certain signal to the A lead and the flow of current in at least one line of said line pair, followed by the removal of said certain signal from the A lead, for generating a third control signal, first relay means operable in response to either said first or third control signals, second relay means operable in response to either said second or third control signals, means for applying current from a current supply to the interrupter motor of the key telephone system, for applying lamp-flash current from a current supply to the key telephone system line lamp associated with said line pair, and for applying ringer or buzzer current from a current supply to the ringer or buzzer of the key telephone system when said first relay means is operated and said second relay means is unoperated, means for applying steady-lamp current from a current supply to the key telephone system line lamp when said second relay means is operated and said first relay means is unoperated, and means for conducting current between said line pair and for applying lamp-wink current from a current supply to the key telephone system line lamp when said first and second relay means are operated, and wherein said holding circuit includes
- first logic means coupled to said A lead for producing a first logical signal if said certain signal is placed on the A lead for longer than a predetermined period of time,
- line current detecting means coupled to one line of the pair for producing a second logical signal substantially immediately when line current flows in said one line and for producing a third logical signal if the line current flows in said one line for longer than a certain period of time,
- second logic means responsive to the coincident production of said first, second and third logical signals for producing a fourth logical signal, and
- binary latch means responsive to the removal of said certain signal from the A lead and production of said third and fourth logical signals for generating said third control signal.

2. The circuit of claim 1 wherein said first logic means includes a first capacitor and a first resistor coupled in series to the A lead, and a NAND gate whose input is coupled to the junction of said first capacitor and first resistor, said NAND gate being operable to produce the first logical signal when the first capacitor charges to a predetermined voltage level.

3. The circuit of claim 2 wherein said line current detection means comprises an optically-coupled isolator, the diode of which is coupled to one line of said line pair, a second resistor coupled to the collector of the transistor of said isolator, a second capacitor coupled in a series with the second resistor, said transistor assuming a conducting condition when line current flows in said one line to thereby produce the second logical signal, and said second capacitor charging to a predetermined voltage level when line current flows in said one line for longer than a predetermined period of time to thereby produce said third logical signal.

4. The circuit of claim 3 wherein said second logic means comprises a NOR gate having three inputs, one of which is coupled to the collector of said transistor and another of which is coupled to the junction between said resistor and said second capacitor, a third capacitor coupled to the third one of said inputs, and a third resistor coupling the output of said NAND gate to said third input.

5. The circuit of claim 3 wherein said latch means comprises second and third NOR gates, said second NOR gate having three inputs, one of which is coupled to the junction of said second resistor and second capacitor, a second of which is coupled to the junction of said first resistor and first capacitor, and a third of which is coupled to the output of said third NOR gate, said third NOR gate having a pair of inputs, a first of which is coupled to the output of said second NOR gate and a second of which is coupled to the output of said first NOR gate, and a second NAND gate whose input is coupled to the output of said second NOR gate, and whose output is coupled to said first and second relay means.

6. The circuit of claim 1 wherein said ringing current detection circuit comprises a diode coupled to one line of the line pair, a neon gas discharge tube coupled in series with the diode, a capacitor coupled in series between the gas discharge tube and ground potential, a pair of NAND gates coupled in series and whose input is coupled to the junction between the capacitor and the gas discharge tube, said NAND gates generating said first control signal when the charge on said capacitor exceeds some predetermined threshold level.

7. The circuit of claim 6 wherein said ringing current detection circuit further comprises capacitor discharge means including a resistor and diode coupled in series between the A lead and the junction of said gas discharge tube and said capacitor.

* * * * *